Aug. 10, 1965  J. T. CARLETON  3,200,046
NEUTRONIC REACTOR STRUCTURE
Filed April 21, 1950  2 Sheets-Sheet 1

INVENTOR.
John Thomas Carleton
BY
Roland A. Anderson
Attorney.

Aug. 10, 1965  J. T. CARLETON  3,200,046
NEUTRONIC REACTOR STRUCTURE
Filed April 21, 1950  2 Sheets-Sheet 2

INVENTOR.
John Thomas Carleton
BY
Roland A. Anderson
Attorney

United States Patent Office 3,200,046
Patented Aug. 10, 1965

3,200,046
NEUTRONIC REACTOR STRUCTURE
John T. Carleton, Richland, Wash., assignor to the United
States of America as represented by the United States
Atomic Energy Commission
Filed Apr. 21, 1950, Ser. No. 157,287
2 Claims. (Cl. 176—41)

This invention relates to an improvement in a neutronic reactor, and more specifically to an improvement in the moderator structure of a neutronic reactor.

Graphite has been used as a moderator since the development of the neutronic reactor and its desirable characteristics for this purpose are now well known in the art. It is observed that graphite expands when subjected to high neutron densities, and that this expansion is much greater than can be anticipated by calculations based on thermal expansion alone.

It is believed that this unexpected expansion is due to damage to the graphite as a result of the bombardment of neutrons of high energy. The energy of a neutron is reduced to thermal energy by elastic collisions with atoms of the graphite moderator, thereby imparting to the moderator atom a portion of the energy of the neutron. In an ideal elastic collision head-on with a moderator atom of the same mass as the neutron, all of the energy due to the velocity of the neutron would be imparted to the moderator atom and the neutron would thereafter possess only the energy imparted to it by thermal agitation due to the temperature of the surrounding medium. Practically a portion of the energy gained by the moderator atom by the collision with the neutron is dissipated in the form of heat. Hence, a temperature rise is observed in the moderator. However, if the collision is direct and the incident neutron has considerable energy, the moderator atom will be knocked from its position in the crystal lattice structure of a crystalline moderator. This may merely cause a rearrangement of the atoms in the moderator crystal lattice structure, or it may result in the bombarded atom leaving the crystal entirely and taking up a permanent interstitial position. It is believed that it is this latter alternative that causes the expansion of the graphite in a moderator. It is also observed that graphite produced by the extrusion method will expand principally normal to the axis of extrusion.

Graphite expansion is particularly objectionable in the type of reactor utilizing coolant tubes through the graphite in order to restrict the temperature of the reactor. In one common type of reactor, the fissionable material is placed within the coolant tubes, and it is necessary that these tubes permit the removal of such material. Hence, warping and distorting of these tubes resulting from the expansion of the moderator will render the neutronic reactor unusable.

Thus, it is the principal object of this invention to provide a nuclear reactor with a graphite moderator that will not distort by expansion due to neutron bombardment. Other objects of this invention will become apparent upon further reading of this application.

For a further understanding of this invention reference is made to the drawings in which.

The neutronic reactor using the graphite block moderator and utilizing process tubes for cooling and production which is used to illustrate this invention is more fully described and claimed in Creutz et al. Patent 2,910,418, dated October 28, 1959, and reference is made thereto. The present application points out only those features of the reactor which are essential to the understanding of this invention, and the improvements constituting this invention.

Figure 1:
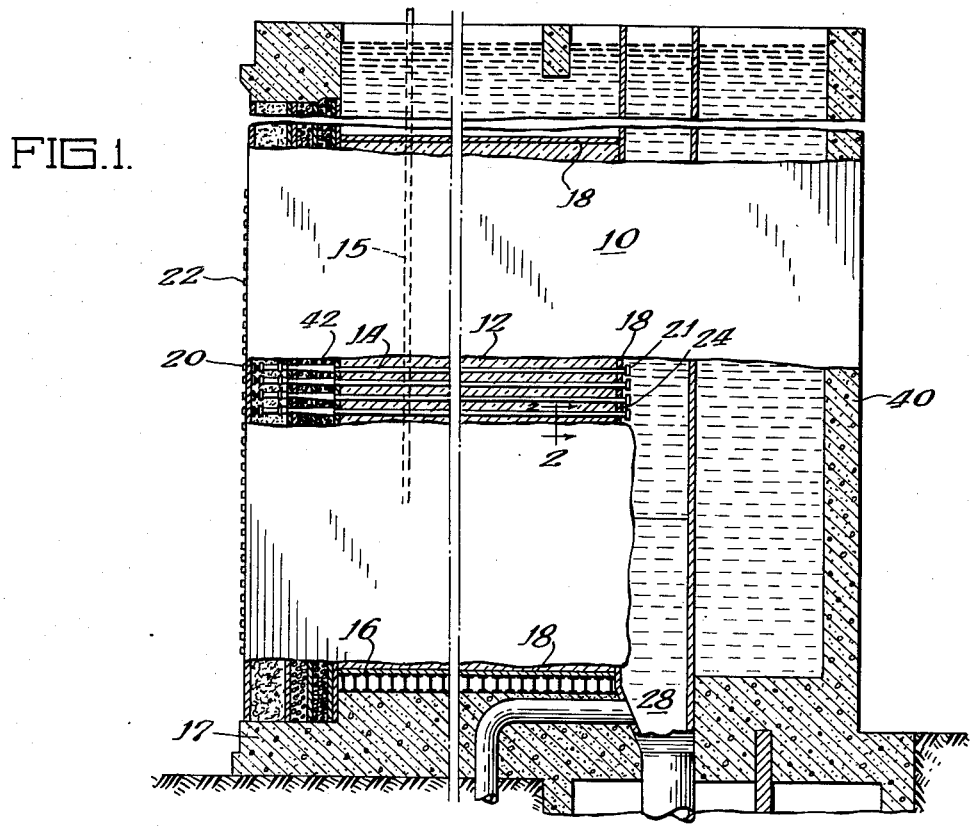
FIGURE 1 is a schematic vertical sectional view of a neutronic reactor utilizing a graphite moderator through which process tubes are placed.
Figure 2:
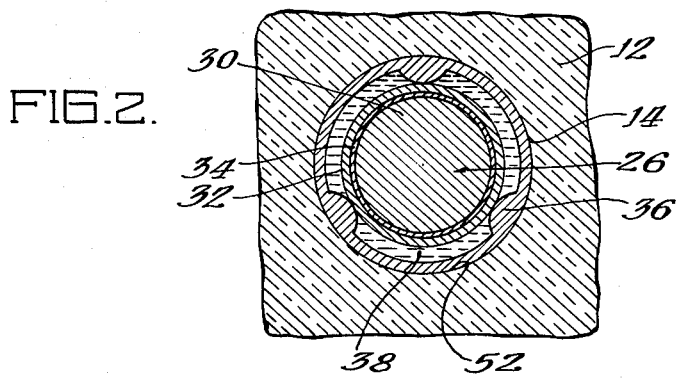
FIGURE 2 is an enlarged fragmentary sectional view of a process tube and the surrounding graphite taken along line 2 of FIGURE 1.

FIGURE 1 shows a neutronic reactor designated 10. It has a graphite moderator 12 through which horizontal process tubes 14 are disposed. The graphite moderator 12 is supported on a horizontal row of stringers 16 which rest upon a concrete base 17. A metal shell 18 surrounds the graphite moderator, but the ends of the horizontal process tubes 14 extend through the shell 18. The ends of the process tubes 14 are sealed with plugs 20 and 21. Fuel elements, designated 26 in FIGURE 2, may be inserted into the process tubes 14 by removing the plug 20 on the front face 22 of the reactor 10. The fuel elements 26 may be removed from the reactor 10 by removing the plug 21 on the back face 24 of the reactor 10 and pushing the fuel element 26 out of the process tube 14 from the front face 22 of the reactor 10. It will then fall into the vertical chute 28 which removes it from the reactor 10. The fuel element 26 consists of a center section of fissionable material 30, which may be uranium, and which is sealed in a container 32 that may be constructed of aluminum. The fissionable material 30 is bonded to the container 32 by a bonding material 34 which assures adequate heat conduction between the fissionable material 30 and the container 32. The fuel element 26 is placed within the process tube 14, and rests on longitudinal ribs 36. Between the ribs 36 within the process tube 14 is an annulus 38 which is used to conduct a coolant, usually water. Control rods 15 sliding into the moderator 12 are used to limit the neutron density in the reactor 10 by absorbing neutrons. Lead and iron shot 42 between the face 22 of the reactor 10 and the shell 18 shield the face 22 of the reactor 10 from emanations from within the reactor 10. The other sides of the reactor 10 are shielded by concrete walls 40. Water is circulated around the tank 18 to provide additional shielding from the emanations produced by fission within the reactor 10.

The moderator 12 consists of two types of graphite blocks 44 and 46 in accordance with the present invention. The blocks 44 and 46 differ in two respects. A graphite block 46 has a smaller cross section, and it is provided with a central passage 52 into which the process tube 14 is placed. The block 44 is merely a solid rectangular block of graphite. In both cases the blocks are produced by the extrusion process and have an axis of extrusion parallel to their longitudinal axes.

Figure 3:
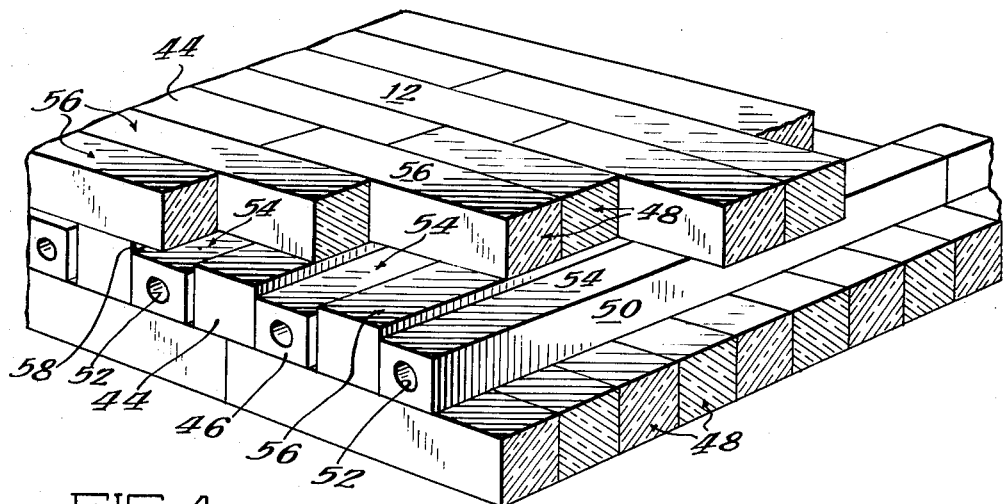
FIGURE 3 is a fragmentary isometric view of a portion of the graphite blocks used in a central portion of the graphite moderator of the reactor shown in FIGURE 1.
Figure 4:
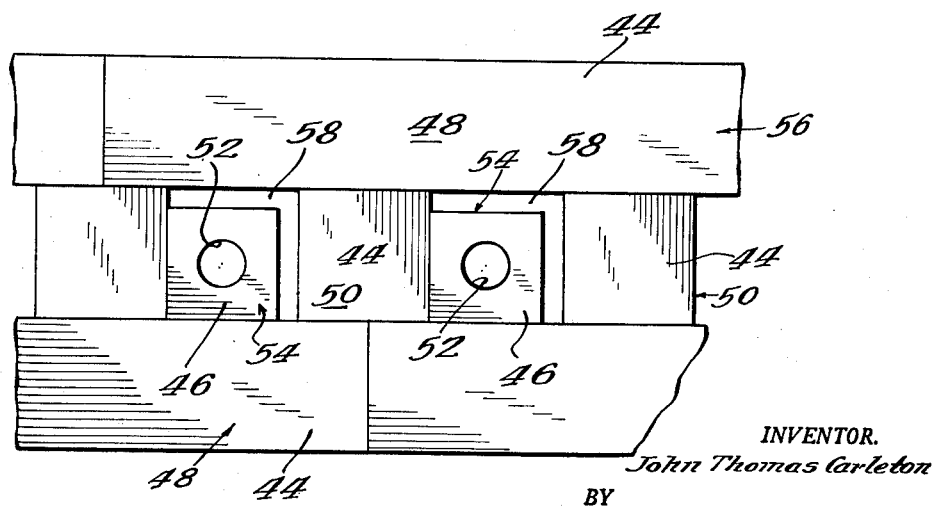
FIGURE 4 is a fragmentary elevational view of the portion of the graphite moderator shown in FIGURE 3.

FIGURE 3 shows the stacking of the graphite blocks 44 and 46 in a center portion of the moderator 12. The layers 48 are alternated with the layers 50 throughout the moderator 12. These layers differ in that the layers 48 are composed of only nonperforated graphite blocks 44 arranged in rows 56, while layers 50 consist of both nonperforated graphite blocks 44 arranged in rows 56 and perforated graphite blocks 46 arranged in rows 54, and in that the longitudinal axes of the rows 56 in layers 48 are normal to the longitudinal axes of the rows 54 and 56 in layers 50. The layers 50 consist of rows 54 of perforated blocks 46 alternated between rows 56 of nonperforated blocks 44. The perforations 52 are aligned in each row 54 in order to accommodate a process tube 14. Each layer 50 covers as much area as a layer 48 even though the perforated blocks 46 within the layer 50 are smaller than the nonperforated blocks 44 used in a layer 48. Hence, a space 58 is left between the perforated and nonperforated graphite blocks 46 and 44, as shown in FIGURES 3 and 4.

A graphite block moderator 12 constructed as disclosed in this application will not distort due to expansion of the graphite in prolonged high neutron densities. Experiments have shown a large portion of the expansion in graphite due to nuclear bombardment is in the graphite immediately adjacent to the fissionable material. In other words, it will largely occur in the perforated graphite blocks 46. Since these graphite blocks 46 have smaller cross sections than the larger graphite blocks 44, they may expand into the space 58 between these blocks 46 and the larger graphite blocks 44. Hence, there is no cause to distort the overall structure of the graphite in the moderator 12. Experience has also shown that the expansion is principally normal to the axis of extrusion of the graphite. Since the blocks 46 have longitudinal extrusion axes, it is not necessary to leave a space between the graphite blocks 46 in the rows 54.

In this particular embodiment of the invention the larger nonperforated graphite blocks 44 have a cross section 4.18 inches by 4.18 inches. The smaller graphite blocks 46 have a cross section of only 4.06 inches by 4.06 inches. Hence, there is a space between the perforated blocks 46 and the nonperforated blocks 44 of 0.12 inch. Experimental data indicate that this is an adequate spacing.

It is understood that the invention is not confined to the particular embodiment here described, but is to be limited only in accordance with the scope of the following claims.

What is claimed is:

1. A neutronic reactor, comprising first and second sets of horizontal layers of graphite blocks laid one on top of another, the layers of the first set alternating with the layers of the second set, all the blocks of the first set being nonperforated and of the same cross-sectional dimensions and extending in the same direction, each block of each layer of the first set being in contact with the two blocks of the same layer on opposite sides of the said each block, all the blocks of the second set extending in same direction as one another and transversely to the blocks of the first set, each layer of the second set comprising nonperforated blocks and perforated blocks alternating with one another, all the nonperforated blocks of the second set being of the same cross-sectional dimensions as the blocks of the first set, all the perforated blocks housing material fissionable by neutrons of thermal energy and being of smaller cross-sectional dimensions than the nonperforated blocks, wherein each perforated block is spaced from a nonperforated block in the layer directly above and from one of the two nonperforated blocks of the same layer as the said perforated block and on opposite sides thereof.

2. The neutronic reactor specified in claim 1, each nonperforated block being 4.18 inches by 4.18 inches in cross section, each perforated block being 4.06 inches by 4.06 inches in cross section.

References Cited by the Examiner
UNITED STATES PATENTS

| 1,807,868 | 6/31 | Nygaard | 263—46 X |
| 2,561,933 | 7/51 | Longenecker | 263—46 |
| 2,585,552 | 2/52 | Hosbein | 263—46 |

FOREIGN PATENTS 233,011  10/44  Switzerland.

OTHER REFERENCES

Smyth: "Atomic Energy for Military Purposes," pages 84, 103, 177–180, August 1945.

Lapp and Andrews: "Nuclear Radiation Physics," pages 325 and 393, Prentice-Hall (1948).

Kelly et al.: Phy. Rev. 73, 1135–9 (1948).

The Science and Engineering of Nuclear Power, vol. I. Addison: Wesley Press, Inc. 1947. Page 303, vol. II (1949) p. 209.

Nucleonics, December 1949, pages 38–49. (An article by Ohlinger.)

REUBEN EPSTEIN, *Primary Examiner.*

SAMUEL BOYD, JAMES L. BREWRINK, WILLIAM G. WILES, *Examiners.*